United States Patent
Therien et al.

(10) Patent No.: US 11,225,320 B2
(45) Date of Patent: Jan. 18, 2022

(54) SYSTEM AND METHOD FOR MITIGATING AN EFFECT OF AN EXCITATION OF A STRUCTURAL FLEXIBLE MODE OF AN AIRCRAFT

(71) Applicant: BOMBARDIER INC., Dorval (CA)

(72) Inventors: Sylvain Therien, Longueuil (CA); David Reist, Chute A Blondeau (CA)

(73) Assignee: BOMBARDIER INC., Dorval (CA)

( * ) Notice: Subject to any disclaimer, the term of this patent is extended or adjusted under 35 U.S.C. 154(b) by 145 days.

(21) Appl. No.: 16/661,411

(22) Filed: Oct. 23, 2019

(65) Prior Publication Data
US 2020/0130814 A1 Apr. 30, 2020

Related U.S. Application Data

(60) Provisional application No. 62/750,538, filed on Oct. 25, 2018.

(51) Int. Cl.
*B64C 13/50* (2006.01)
*B64C 13/04* (2006.01)
*B64C 19/02* (2006.01)
*B64C 9/12* (2006.01)

(52) U.S. Cl.
CPC .............. *B64C 13/503* (2013.01); *B64C 9/12* (2013.01); *B64C 13/0421* (2018.01); *B64C 19/02* (2013.01)

(58) Field of Classification Search
CPC ... B64C 13/503; B64C 13/0421; B64C 19/02; B64C 9/10; B64C 9/12
See application file for complete search history.

(56) References Cited

U.S. PATENT DOCUMENTS

| | | | |
|---|---|---|---|
| 4,447,028 A * | 5/1984 | Wang | ........................ B64C 9/00 244/212 |
| 5,224,667 A | 7/1993 | Lacabanne | |
| 5,452,865 A | 9/1995 | Tran | |
| 6,064,923 A | 5/2000 | Bilange et al. | |
| 7,896,288 B2 | 3/2011 | Sauvinet | |
| 2003/0205644 A1* | 11/2003 | Najmabadi | ............. B64C 13/16 244/195 |
| 2007/0018053 A1 | 1/2007 | Enzinger et al. | |

(Continued)

FOREIGN PATENT DOCUMENTS

EP  2615026 A1  7/2013

OTHER PUBLICATIONS

Stephane Delannoy, A380 Roll Kinematics Design, IFAC Proceedings Volumes, 2007, pp. 103-108, vol. 40, Issue 7, France.

(Continued)

*Primary Examiner* — Rodney A Bonnette
(74) *Attorney, Agent, or Firm* — Norton Rose Fulbright Canada LLP

(57) ABSTRACT

Systems and methods for controlling a fixed-wing aircraft during flight are disclosed. The aircraft comprises first and second flight control surfaces of different types. The method comprises determining that a pilot command of the first flight control surface will excite a structural flexible mode of the aircraft and then executing the pilot command of the first flight control surface in conjunction with a command of the second flight control surface to mitigate the effect of the excitation of the structural flexible mode of the aircraft.

19 Claims, 5 Drawing Sheets

(56) References Cited

U.S. PATENT DOCUMENTS

| | | | |
|---|---|---|---|
| 2009/0250551 A1* | 10/2009 | Sauvinet | B64C 9/12 244/87 |
| 2010/0070114 A1* | 3/2010 | Puig | B64C 13/18 701/10 |
| 2016/0194074 A1 | 7/2016 | Hagerott et al. | |
| 2019/0204855 A1* | 7/2019 | Olsthoorn | B64C 13/503 |

OTHER PUBLICATIONS

Claude Lelaie, A380: Development of the Flight Controls, Safety First—The Airbus Safety Magazine, (Jul. 2012), pp. 12-15, Issue 14.

Aviation Safety and Pilot Control: Understanding and Preventing Unfavorable Pilot-Vehicle Interactions, (1997), pp. 14-29, The National Academies Press, Washington, DC.

Martin J. Brenner, Aeroservoelastic Modeling and Validation of a Thrust-Vectoring F/A-18 Aircraft, NASA technical Paper 3647, (1996), pp. 11-16, California.

European Patent Office, Communication re. European search report for European patent application No. 19204668.8, dated Mar. 6, 2020.

* cited by examiner

SYSTEM AND METHOD FOR MITIGATING AN EFFECT OF AN EXCITATION OF A STRUCTURAL FLEXIBLE MODE OF AN AIRCRAFT

CROSS REFERENCE TO RELATED APPLICATION AND CLAIM OF PRIORITY

The present application claims priority to U.S. provisional patent application No. 62/750,538 filed on Oct. 25, 2018, the entire contents of which are incorporated herein by reference.

TECHNICAL FIELD

The disclosure relates generally to aircraft, and more particularly to controlling aircraft during flight.

BACKGROUND

Aircraft-pilot coupling (APC) events can result in inadvertent and unwanted aircraft motions that originate in abnormal interactions between an aircraft and a pilot. The unwanted aircraft motions can include changes in the aircraft attitude and flight path caused by a flight control system of the aircraft and can affect passenger comfort and aircraft control. APC events can occur due to interactions between the pilot and the aircraft when the pilot attempts to control the aircraft. Since the pilot's actions can depend on the motions of the aircraft induced by pilot commands, the aircraft and pilot can form a closed-loop feedback control system. Undesirable APC events can be identified as instabilities in the closed-loop feedback control system that includes the pilot and the aircraft.

SUMMARY

In one aspect, the disclosure describes a method for mitigating an effect of an excitation of a structural flexible mode of an aircraft during flight where the aircraft comprising ailerons for causing movement of the aircraft about a roll axis and a rudder for causing movement of the aircraft about a yaw axis. The method comprises:

receiving a command of the ailerons, the command of the ailerons having a characteristic that will cause the command of the ailerons to excite the structural flexible mode of the aircraft; and then executing the command of the ailerons in conjunction with a command of the rudder configured to mitigate the effect of the excitation of the structural flexible mode of the aircraft.

The structural flexible mode may include bending of a vertical stabilizer of the aircraft.

The command of the ailerons may be oscillatory and the characteristic may be a predetermined frequency of concern for the command of the ailerons.

The characteristic may include a magnitude of the command of the ailerons corresponding to a predetermined magnitude of concern.

The command of the ailerons may cause downward movement of a right wing of the aircraft and the command of the rudder may cause a left deflection of the rudder.

When high-lift flight control surfaces of the aircraft are in a retracted configuration, the command of the rudder may have a first magnitude. When the high-lift flight control surfaces of the aircraft are in a deployed configuration, the command of the rudder may have a second magnitude different from the first magnitude.

A magnitude of the command of the rudder may be dependent on a magnitude of the command of the ailerons.

The characteristic may be dependent on an altitude of the aircraft.

The characteristic may be dependent on a speed of the aircraft.

The characteristic may be dependent on a weight of the aircraft.

The characteristic may be dependent on a fuel quantity in the aircraft.

The command of the ailerons and the command of the rudder may be executed simultaneously.

Embodiments can include combinations of the above features.

In another aspect, the disclosure describes a method for mitigating an effect of an excitation of a structural flexible mode of an aircraft during flight where the aircraft comprise first and second flight control surfaces of different types. The method comprises:

receiving a command of one or more first flight control surfaces, the command of the one or more first flight control surfaces having a characteristic that will cause the command of the one or more first flight control surfaces to excite the structural flexible mode of the aircraft; and then executing the command of the one or more first flight control surfaces in conjunction with a command of one or more second flight control surfaces configured to mitigate the effect of the excitation of the structural flexible mode of the aircraft.

The command of the one or more first flight control surfaces may be oscillatory and the characteristic may be a predetermined frequency of concern for the command of the one or more first flight control surfaces.

The characteristic may include a magnitude of the command of the one or more first flight control surfaces corresponding to a predetermined magnitude of concern.

When high-lift flight control surfaces of the aircraft are in a retracted configuration, the command of the one or more second flight control surfaces may have a first magnitude. When the high-lift flight control surfaces of the aircraft are in a deployed configuration, the command of the one or more second flight control surfaces may have a second magnitude different from the first magnitude.

A magnitude of the command of the one or more second flight control surfaces may be dependent on an active high-lift configuration of the aircraft.

A magnitude of the command of the one or more second flight control surfaces may be dependent on a magnitude of the command of the one or more first flight control surfaces.

The characteristic may be dependent on an altitude of the aircraft.

The characteristic may be dependent on a speed of the aircraft.

The characteristic may be dependent on a weight of the aircraft.

The characteristic may be dependent on a fuel quantity in the aircraft.

The command of the one or more first flight control surfaces and the command of the one or more second flight control surfaces may be executed simultaneously.

The first and second flight control surfaces may be associated with different rotation axes of the aircraft.

The one or more first flight control surfaces may comprise a rudder and the one or more second flight control surfaces may comprise an aileron.

The one or more first flight control surfaces may comprise an elevator and the one or more second flight control surfaces may comprise an aileron.

Embodiments can include combinations of the above features.

In another aspect, the disclosure describes a system for mitigating an effect of an excitation of a structural flexible mode of an aircraft during flight where the aircraft comprise first and second flight control surfaces of different types. The system comprises:

a pilot input device for receiving pilot input indicative of commands of one or more first flight control surfaces of the aircraft; and a controller operatively coupled to the pilot input device to receive signals indicative of the commands of the one or more first flight control surfaces of the aircraft, the controller being configured to:

when a command of the one or more first flight control surfaces having a characteristic that will cause the command of the one or more first flight control surfaces to excite the structural flexible mode of the aircraft is received, cause the command of the one or more first flight control surfaces to be executed in conjunction with a command of one or more second flight control surfaces configured to mitigate the effect of the excitation of the structural flexible mode of the aircraft.

The command of the one or more first flight control surfaces may be oscillatory and the characteristic may be a predetermined frequency of concern for the command of the one or more first flight control surfaces.

The characteristic may include a magnitude of the command of the one or more first flight control surfaces corresponding to a predetermined magnitude of concern.

The controller may be configured so that:

when high-lift flight control surfaces of the aircraft are in a retracted configuration, the command of the one or more second flight control surfaces has a first magnitude; and when the high-lift flight control surfaces of the aircraft are in a deployed configuration, the command of the one or more second flight control surfaces has a second magnitude different from the first magnitude.

A magnitude of the command of the one or more second flight control surfaces may be dependent on an active high-lift configuration of the aircraft.

A magnitude of the command of the one or more second flight control surfaces may be dependent on a magnitude of the command of the one or more first flight control surfaces.

The characteristic may be dependent on an altitude of the aircraft.

The characteristic may be dependent on a speed of the aircraft.

The characteristic may be dependent on a weight of the aircraft.

The characteristic may be dependent on a fuel quantity in the aircraft.

The controller may be configured to cause the command of the one or more first flight control surfaces and the command of the one or more second flight control surfaces to be executed simultaneously.

The first and second flight control surfaces may be associated with different rotation axes of the aircraft.

The one or more first flight control surfaces may comprise a rudder and the one or more second flight control surfaces may comprise an aileron.

The one or more first flight control surfaces may comprise an elevator and the one or more second flight control surfaces may comprise an aileron.

The one or more first flight control surfaces may comprise an aileron and the one or more second flight control surfaces may comprise a rudder.

The command of the aileron may cause downward movement of a right wing of the aircraft and the command of the rudder may cause a left deflection of the rudder.

The structural flexible mode may include bending of a vertical stabilizer of the aircraft.

The structural flexible mode may include bending of a fuselage of the aircraft.

The structural flexible mode may include torsion of a fuselage of the aircraft.

The structural flexible mode may include bending of a wing of the aircraft.

Embodiments can include combinations of the above features.

In another aspect, the disclosure describes an aircraft comprising a system as described herein.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

In various embodiments, systems and methods described herein can improve passenger comfort during flight of aircraft in some situations by mitigating the effects of the excitation of one or more structural flexible modes of aircraft and consequently preventing inadvertent aircraft-pilot coupling (APC) events. It was found that APC events could potentially develop when a pilot command excites a structural resonant flexible (e.g., bending, torsional) mode of an aircraft structure (i.e., airframe). For example, in reference to a roll axis of the aircraft, abrupt back-and-forth (e.g., oscillatory) roll commands at or around a certain frequency could potentially excite a flexible mode of the aircraft structure and cause an unexpected lateral acceleration that can be felt by the pilot in the cockpit of the aircraft. Such unexpected lateral acceleration felt by the pilot under this condition could in turn cause the pilot to inadvertently command another roll command in the opposite direction, which could result in an APC event. The pilot's inadvertent subsequent command could result in further exciting the same structural flexible mode of the aircraft and worsening the situation thereby affecting pilot and passenger comfort.

In various embodiments, the systems and methods described herein can make use of a characteristic of a pilot command to determine whether a pilot command of one or more first flight control surfaces is likely to excite a structural flexible mode of the aircraft. If it is determined that the flexible mode is likely to be excited by such pilot command, a mitigating command of another flight control surface of a different type can be executed in conjunction with the pilot command in order to mitigate (e.g., counteract) the effects of the excitation of the flexible mode. The mitigating command can eliminate or reduce the magnitude of the unexpected response of the aircraft structure and can therefore reduce the risk of inducing an APC event caused by the excitation of a structural flexible mode of the aircraft.

Aspects of various embodiments are described through reference to the drawings.

Figure 1:
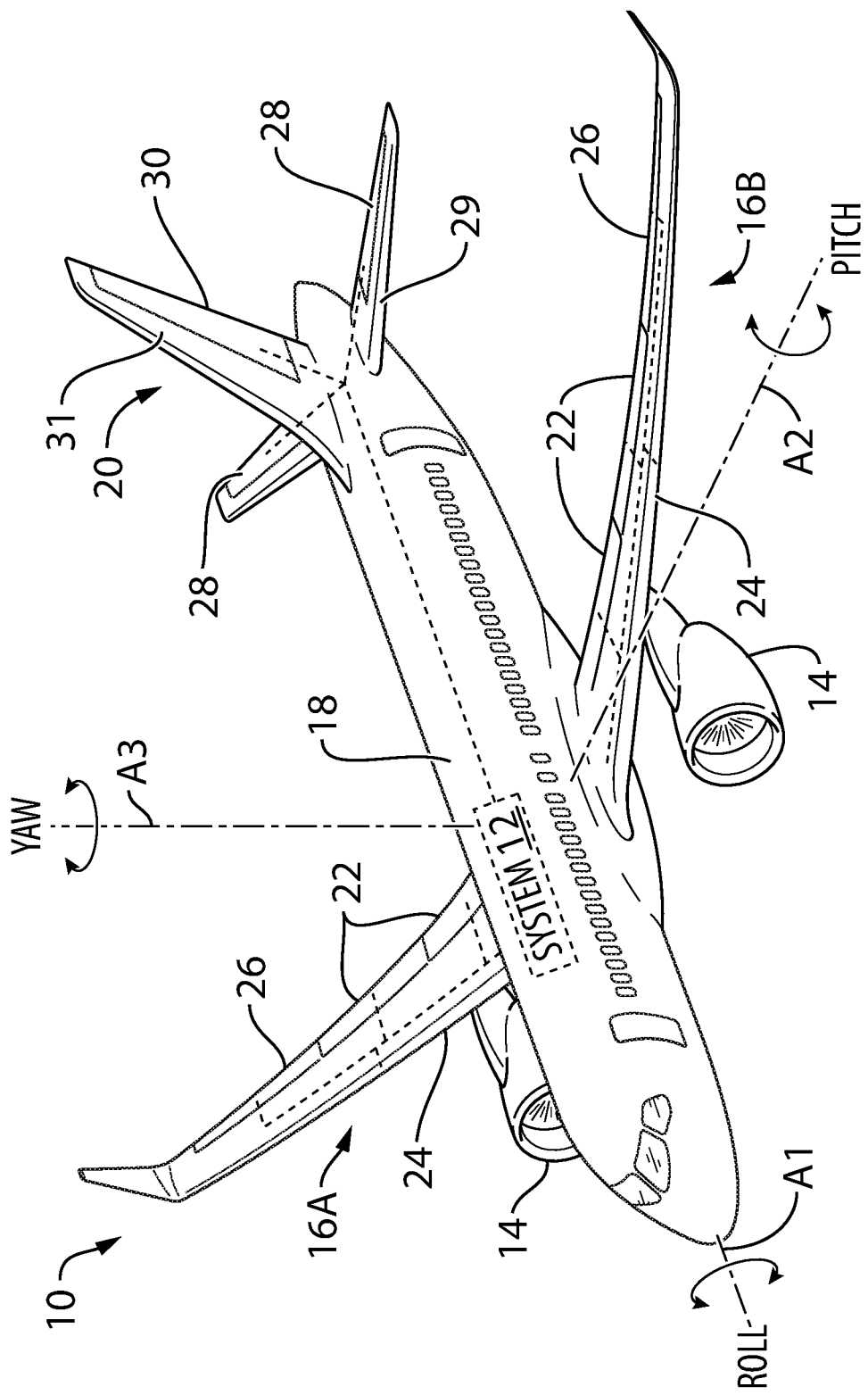
FIG. 1 is a perspective view of an exemplary aircraft comprising a control system as described herein.

FIG. 1 is a perspective view of an exemplary aircraft 10 which can comprise system 12 (shown schematically) for controlling aircraft 10 during flight. Aircraft 10 can be any type of aircraft such as corporate, private, commercial and passenger aircraft suitable for civil aviation. Aircraft 10 can be manned or unmanned (e.g., drone). For example, aircraft 10 can be a (e.g., ultra-long range) business jet or a narrow-body, twin-engine jet airliner. Aircraft 10 can be a fixed-wing aircraft comprising one or more engines 14. Alternatively, aircraft 10 can be a glider with no engines. Aircraft 10 can comprise wings 16A, 16B (referred generally herein as "wings 16"), fuselage 18 and empennage 20. One or more of engines 14 can be mounted to fuselage 18. Alternatively, or in addition, one or more of engines 14 can be mounted to wings 16. Aircraft 10 can comprise a passenger cabin and a cockpit inside fuselage 18. On the aircraft depicted in FIG. 1, and in relation to a forward-facing direction, wing 16A is a right-hand (e.g., starboard) side wing and wing 16B is a left-hand (e.g., port) side wing.

Aircraft 10 can include any known or other suitable flight control surfaces configured to interact with air flowing around aircraft 10 during flight. Control system 12 can be operatively coupled to such flight control surfaces. Such flight control surfaces can include trailing edge flaps 22 and leading edge slats 24 which may be used as "high-lift" surfaces that may be deployed to increase the amount of lift generated by wings 16 to which trailing edge flaps 22 and leading edge slats 24 are mounted. For example, such high-lift flight control surfaces may be deployed during landing, take-off and/or during any other appropriate phases of flight or conditions requiring increased lift. If aircraft 10 includes variable camber functionality such that trailing edge flaps 22 can provide negative camber, trailing edge flaps 22 can also provide decreased lift during some phases of flight.

Aircraft 10 can also include one or more ailerons 26 movably mounted to each wing 16. Ailerons 26 can be considered primary flight control surfaces that cause aircraft 10 to move (i.e., rotate) about longitudinal axis A1 during flight. In other words, movement of ailerons 16 in flight can cause aircraft 16 to roll. Ailerons 26 can be located on the outboard trailing edge of each wing 16.

Aircraft 10 can also include one or more elevators 28 movably mounted to horizontal stabilizer 29 of empennage 20. Elevators 28 can be considered primary flight control surfaces that cause aircraft 10 to move (i.e., rotate) about horizontal or lateral axis A2 during flight. In other words, movement of elevators 28 in flight can cause aircraft 16 to pitch up or down. Each elevator 28 can be hinged to a trailing edge of a horizontal stabilizer 29 and can extend along most or all of its span. In some situations, an asymmetric deflection of elevators 28 could potentially be used to induce rotation (e.g., roll) of aircraft 10 about longitudinal axis A1 during flight.

Aircraft 10 can also include one or more rudders 30 movably mounted to vertical stabilizer 31 (also referred herein as "vertical tail fin") of empennage 20. Rudder 30 can be considered a primary control surface that causes aircraft 10 to yaw or move (i.e., rotate) about vertical axis A3. Rudder 30 can be hinged to a trailing edge of vertical stabilizer 31. Rudder 30 can provide directional control and thus point the nose of aircraft 10 in the direction desired. A deflection of rudder 30 to the right can cause the nose of aircraft 10 to move toward the right and deflection of rudder 30 to the left can cause the nose of aircraft 10 to move toward the left.

Figure 2:
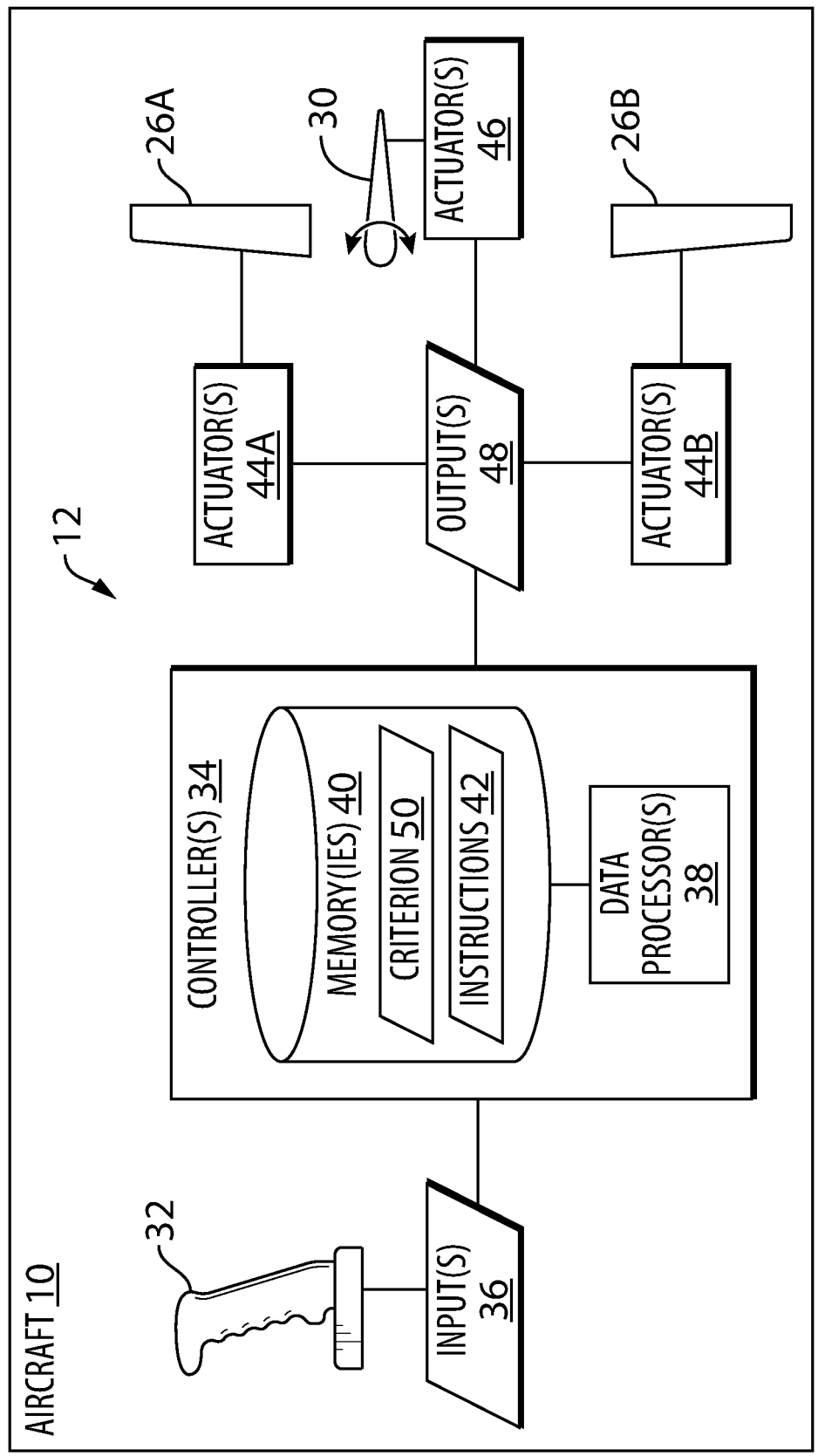
FIG. 2 is an exemplary schematic representation of the control system of the aircraft of FIG. 1.

FIG. 2 is an exemplary schematic representation of control system 12 of aircraft 10. Control system 12 can comprise one or more pilot input devices 32 (referred hereinafter in the singular) for receiving pilot input indicative of commands of one or more first (e.g., primary) flight control surfaces of aircraft 10, and one or more controllers 34 (referred hereinafter in the singular) operatively coupled to pilot input device 32 to receive input signals 36 indicative of the pilot's desired command(s) of the one or more first flight control surfaces of aircraft 10. Controller 34 can comprise one or more data processors 38 (referred hereinafter in the singular) and one or more non-transitory memories 40 (i.e., data storage devices) (referred hereinafter in the singular) including machine-readable instructions 42 executable by data processor 38. Instructions 42 can be configured to cause controller 34 to perform one or more steps so as to implement a computer-implemented process such that instructions 42, when executed by data processor 38 or other programmable apparatus, can cause the functions/acts specified in the methods described herein to be executed. Memory 40 can comprise any storage means (e.g. devices) suitable for retrievably storing machine-readable instructions 42 executable by data processor 38 of controller 34.

Various aspects of the present disclosure can be embodied as systems, devices, methods and/or computer program products. Accordingly, aspects of the present disclosure can take the form of an entirely hardware embodiment, an entirely software embodiment or an embodiment combining software and hardware aspects. Furthermore, aspects of the present disclosure can take the form of a computer program product embodied in one or more non-transitory computer readable medium(ia) (e.g., memory 40) having computer readable program code embodied thereon. The computer program product can, for example, be executed by controller 34 to cause the execution of one or more methods disclosed herein in entirety or in part. It is understood that, based on the present disclosure, one skilled in the relevant arts could readily write computer program code for implementing the methods disclosed herein.

Controller 34 can be directly or indirectly operatively coupled to actuators 44A, 44B and 46 for controlling and optionally receiving feedback from actuators 44A, 44B and 46 associated with respective flight control surfaces. For example, output signal(s) 48 (e.g., command signal(s)) provided by controller 34 could be used to control actuators 44A, 44B and 46. Controller 34 can be considered part of an avionics suite of aircraft 10. For example, controller 34 can be configured to carry out additional functions than those described herein. In some embodiments, controller 34 can be of the type known as a flight control computer (FCC) of aircraft 10. In some embodiments, control system 12 can be part of a fly-by-wire control system of aircraft 10. Memory 40 can also contain one or more criteria 50 (referred hereinafter as "criterion 50") that, as explained below, are used to determine whether the pilot command of the first flight control surface(s) has one or more characteristics likely to cause excitation of one or more structural flexible modes of aircraft 10. Instructions 42 and criterion 50 can be implemented in the form of control laws (CLAWS) in a FCC of aircraft 10.

The exemplary control system 12 of FIG. 2 is shown in conjunction with ailerons 26A, 26B as first flight control surfaces for which the pilot command is executed, and, rudder 30 as a second flight control surface for which the mitigating command is executed. Actuator 44A is associated with a right aileron 26A of right wing 16A, actuator 44B is associated with a left aileron 26B of left wing 16B, and, actuator 46 is associated with rudder 30. In this embodiment, pilot input device 32 can, for example, be a side stick, center stick or a yoke configured to receive a roll command from the pilot.

It is understood that control system 12 can be used with other flight control surfaces associated with other axes of rotation of aircraft 10 instead or in addition, to mitigate the effects of various structural flexible modes of aircraft 10. With respect to pitch (e.g., axis A2) for example, control system 12 can be operatively coupled to elevators 28 (see FIG. 1) as first flight control surfaces for which the pilot command is executed, and, ailerons 26 (e.g., deflected symmetrically) as second flight control surfaces for which the mitigating command is executed. In some situations, this approach could mitigate the effects of a bending flexible mode of fuselage 18 of aircraft 10 for example. In this embodiment, pilot input device 32 can, for example, be a side stick, center stick or a control column configured to receive a pitch command from the pilot.

With respect to yaw (e.g., axis A3) for example, control system 12 can be operatively coupled to rudder 30 as a first flight control surface for which the pilot command is executed, and, ailerons 26 (e.g., deflected asymmetrically) as second flight control surfaces for which the mitigating command is executed. In this embodiment, pilot input device 32 can be rudder pedals configured to receive a yaw command from the pilot. Alternatively or in addition, control system 12 can be operatively coupled to rudder 30 as a first flight control surface for which the pilot command is executed, and, elevators 28 (e.g., deflected asymmetrically) as second flight control surfaces for which the mitigating command is executed.

Figure 3:
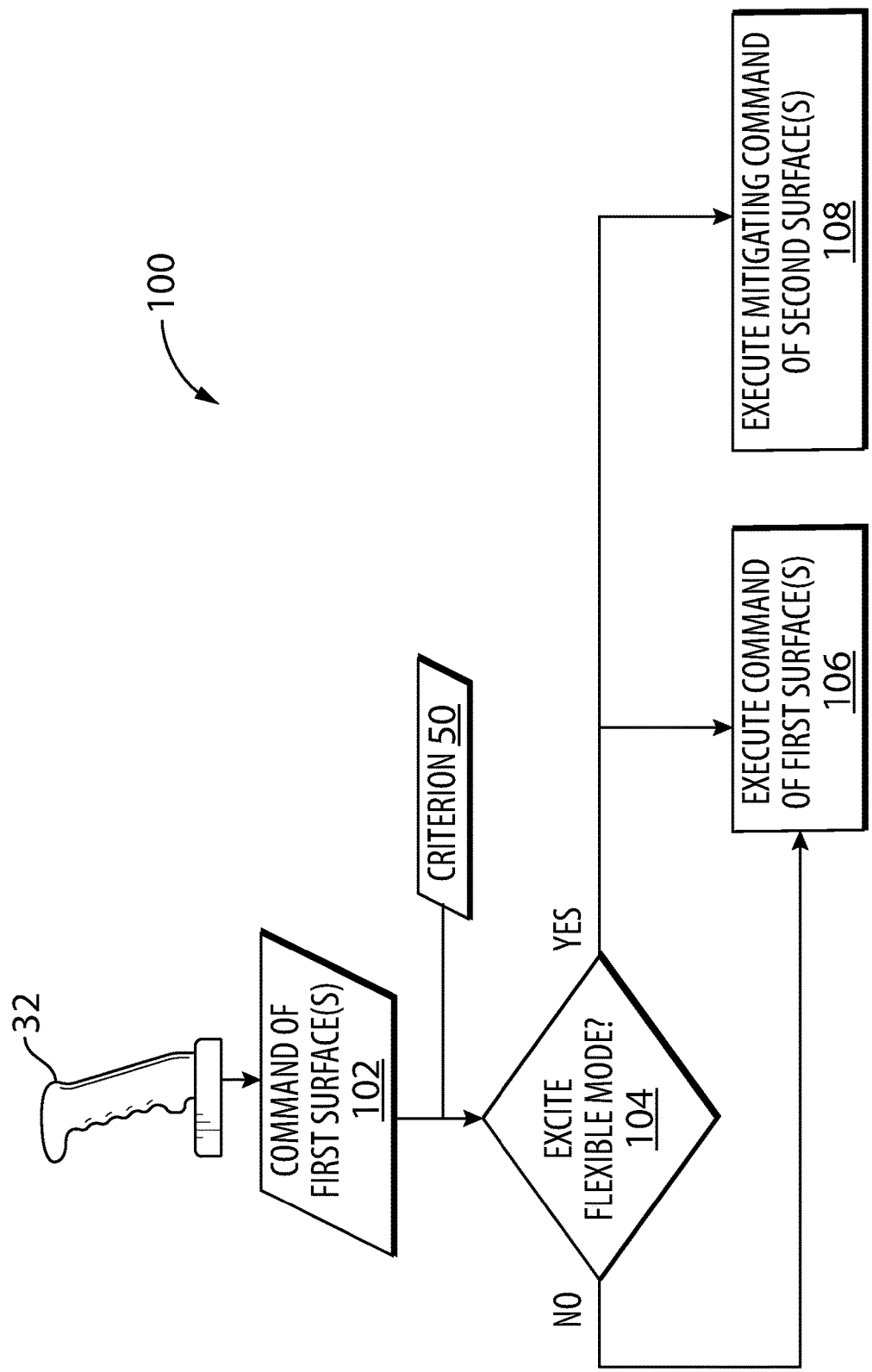
FIG. 3 is a flow diagram of an exemplary method for controlling the aircraft of FIG. 1.

FIG. 3 is a flow diagram of an exemplary method 100 for mitigating an effect of an excitation of a structural flexible mode of aircraft 10 during flight. Method 100 can be performed using system 12 described above or using other systems. For example, machine-readable instructions 42 can be configured to cause controller 34 to perform at least part of method 100. It is understood that aspects of method 100 can be combined with aspects of other methods described herein. In various embodiments, method 100 can comprise:

receiving a command of one or more first flight control surfaces (see block 102) where the command of the one or more first flight control surfaces has a characteristic that will cause the command of the one or more first flight control surfaces to excite the structural flexible mode of the aircraft (see "YES" at block 104); and then executing the command of the one or more first flight control surfaces (see block 106) in conjunction with a mitigating command of one or more second flight control surfaces configured to mitigate the effect of the excitation of the structural flexible mode of aircraft 10 (see block 108).

However, if the command of the one or more first flight control surfaces does not have a characteristic that will cause the command of the one or more first flight control surfaces to excite the structural flexible mode of aircraft 10 (see "NO" at block 104), the command of the one or more first flight control surfaces is executed (see block 106) without execution of the mitigating command of one or more second flight control surfaces configured to mitigate the effect of the excitation of the structural flexible mode of aircraft 10. Accordingly, the mitigating command can be executed only if the pilot (or automatically-generated) command is susceptible to exciting the structural flexible mode. In some embodiments, criterion 50 can be used to determine whether the command of the one or more first flight control surfaces has a characteristic that will cause excitation of the structural flexible mode.

The first and second flight control surfaces referenced in method 100 can be different from each other. For example, the first and second flight control surfaces referenced in method 100 can be of different types meaning that they are associated with flight control functions that are different in nature and that affect the behaviour of aircraft 10 in different ways. For example, the first and second flight control surfaces can be associated with causing rotation of aircraft 10 about different rotation axes A1, A2 and A3 (see FIG. 1) of aircraft 10. However, it is understood that the first and second flight control surfaces can be associated with causing rotation of aircraft 10 about the same rotation axis A1, A2 or A3 (see FIG. 1) of aircraft 10. The first and second flight control surfaces that are used in conjunction with control system 12 can depend on the specific structural flexible mode that is of concern and that is determined to be excited at block 104. In some embodiments, the structural flexible mode can be a vertical tail fin bending (FIN1B) flexible mode of aircraft 10 that can be excited by the actuation of ailerons 26 during a roll maneuver commanded by the pilot. The FIN mode can be a structural flexible mode including bending of vertical stabilizer 31, wing asymmetric bending and fuselage torsion and in-plan bending. The FIN1B mode can be excited by the asymmetric motion of wing(s) 16 which could be the result of aileron activity or high levels of turbulence. This wing motion can transfer to fuselage 18 and consequently induce a lateral acceleration affecting primarily vertical stabilizer 31 and a front portion (e.g., cockpit) of fuselage 18. This lateral acceleration in the cockpit can potentially induce an APC event. In case of the FIN1B flexible mode, the first flight control surface(s) could be ailerons 26 and the second flight control surface(s) could be rudder 30.

Method 100 can make use of multiple criteria 50 to determine whether the command of the first flight control surface has one or more characteristics that will cause excitation of one or more structural flexible modes. Structural flexible modes can include elastic bending or torsion of fuselage 18, wings 16, stabilizers 29 or 31, or empennage 20 either individually or in various combinations. For example, structural flexible modes that might be considered by control system 12 can include, but not limited to, one or more of the following: FIN1B (described above), symmetric or asymmetric wing bending (W1B), fuselage bending (F1B), fuselage torsion (F1T), (e.g., symmetric or asymmetric) wing torsion (W1T) and stabilizer bending (S1B). In some embodiments, the first flight control surface(s) can comprise rudder 30 and the second flight control surface(s) can comprise ailerons 26 (actuated in opposite directions) to mitigate the excitation of one particular flexible (e.g., stabilizer bending, fuselage bending or torsional) mode. In some embodiments, the first flight control surface(s) can comprise elevator(s) 28 and the second flight control surface(s) can comprise ailerons 26 (actuated symmetrically) to mitigate the excitation of another flexible (e.g., fuselage bending) mode. Other examples of techniques for mitigating structural flexible modes can include the following: symmetric or asymmetric deflection of aileron 26 and/or multifunction spoilers could be used to reduce excitation of structural flexible modes involving symmetric or asymmetric wing bending; symmetric elevator deflection could be used to reduce the excitation of structural flexible modes involving symmetric wing bending or fuselage longitudinal bending; asymmetric elevator deflection could be used to reduce the excitation of structural flexible modes involving fuselage torsion; and rudder deflection could be used to reduce the excitation of structural flexible modes involving vertical stabilizer bending and/or fuselage torsion.

The one or more structural flexible modes of aircraft 10 that can be mitigated by control system 12 can be identified and characterized by structural/vibration analysis (e.g., finite element modeling) and/or empirically by way of performing structural/vibration tests on the structure of aircraft 10. For example, the one or more flexible modes can be characterized by identifying corresponding resonant frequencies associated with respective flexible modes. Accordingly, the flexible mode(s) susceptible to be excited can be identified and characterized and suitable criterion 50 can be programmed into memory 40 of controller 34 for example. Criterion 50 can be used to determine whether commands of flight control surfaces are susceptible to excite one or more flexible modes of aircraft 10. The excitation of a flexible mode could, for example, be triggered by the back-and-forth actuation of one or more flight control surfaces at or close to a frequency that corresponds to a resonant frequency of a corresponding flexible mode. As explained above, such excitation of the flexible mode could potentially induce undesirable APC events.

It is understood that various structural flexible modes could be excited by oscillatory (e.g., back-and-forth or in the same direction) commands and/or non-oscillatory commands. For example a structural flexible mode could potentially be excited by a single step input command of a certain magnitude. Accordingly, criterion 50 can, in some embodiments, have the form of a look-up table and/or more complex algorithm(s) where applicable value(s) can be accessed or determined by controller 34 based on the applicable operational condition(s) of aircraft 10 to determine whether a particular command is susceptible to exciting a structural flexible mode. In some embodiments, criterion 50 can comprise one or more values or predetermined ranges of frequencies of actuation associated with one or more respective flight control surfaces and that have been predetermined to be susceptible to excite a flexible mode. For example, in some embodiments, a range of frequencies of criterion 50 can include 2.5 Hz to excite a FIN1B mode of some aircraft. Criterion 50 can be indicative of time periods between successive commands (e.g., between a current command and an immediately preceding command) of the first flight control surfaces that can result in exciting the flexible mode(s). Criterion 50 can be indicative of one or more values or ranges of magnitudes of a command of the first flight control surfaces that can result in exciting the flexible mode(s). Accordingly, criterion 50 can contain one or more predetermined frequencies (e.g., time periods between consecutive commands) of concern for oscillatory commands and/or one or more predetermined magnitudes of concern for oscillatory or single (e.g., step input) commands.

The excitation amplitude and/or natural frequency of a flexible mode and the amount of mitigation required can differ based on the operational condition of aircraft 10. Accordingly, whether or not a mitigating command is executed can depend on the operational condition of aircraft 10. Also, the form (e.g., magnitude, duration, timing) of the mitigating command can vary depending on the operational condition of aircraft 10. For example, in some situations one or more characteristics of a (e.g., FIN1B) flexible mode can vary depending on whether or not wings 16 of aircraft 10 are in a high-lift configuration and also on the type/extent of high-lift configuration. For example: when high-lift flight control surfaces (e.g., flaps 22 and/or slats 24) of aircraft 10 are in a retracted configuration, the mitigating command of the one or more second flight control surfaces can have a first magnitude; and when the high-lift flight control surfaces of aircraft 10 are in a deployed configuration, the mitigating command of the one or more second flight control surfaces can have a second magnitude that is different from the first magnitude. The use and form of the mitigating command can vary depending on the high-lift configuration currently active, for example, depending on whether aircraft has an take-off high-lift configuration or a landing high-lift configuration that is different from the take-off high-lift configuration.

Other parameters that can affect the characteristics (e.g., excitation frequency) of a flexible mode and the mitigating command can include the altitude of aircraft 10, a speed (e.g., true airspeed, calibrated airspeed, Mach number or dynamic air pressure) of aircraft 10, a weight of aircraft 10, a payload of aircraft 10 and/or a fuel quantity in aircraft 10. Accordingly, criterion 50 can comprise values that have been predetermined as a function of such parameters so that applicable values can be used by controller 34 in order to accommodate the various operating conditions of aircraft 10.

The mitigating command of the second fight control surface(s) may not necessarily prevent the excitation of the flexible mode but can mitigate the effects of such excitation to reduce the magnitude or eliminate the unexpected response that would otherwise be felt by the pilot and passengers. Such reduction in the unexpected response can reduce the risk of inducing an APC event. The mitigating command can, for example, be configured to counteract or dampen the bending or torsion of the structure of aircraft 10. The mitigating command can generate a counteracting force on the structure of aircraft 10 to reduce the flexible mode motion of the structure of aircraft 10. In some embodiments, the magnitude of the mitigating command can be relatively small and/or the mitigating command may be of short duration so as not to cause significant rotation of aircraft 10 about axes A1, A2 or A3 that has not been commanded by the pilot. In other words, the mitigating command can be configured to have little to no impact on the attitude or flight path of aircraft 10. In some embodiments, the mitigating command can be automatically introduced by controller 34 based on instructions 42 and criterion 50 so that its introduction and execution can be substantially unnoticeable (e.g., transparent) to the pilot.

In some embodiments, a magnitude of the mitigating command (e.g., amount of rudder deflection) of the one or more second flight control surfaces can be related (e.g., proportional) to a magnitude of the pilot command of the one or more first flight control surfaces. In other words, since the magnitude of the pilot command (e.g., amount of aileron deflection) can affect the magnitude of flexing of the structure of aircraft 10, the magnitude (and optionally duration) of the mitigating command can be selected accordingly.

In some embodiments, the pilot command of the one or more first flight control surfaces (e.g., ailerons 26) and the mitigating command of the one or more second flight control surfaces (e.g., rudder 30) can be executed substantially simultaneously. In some embodiments, the pilot command and the mitigating command may be substantially coextensive. In some embodiments, the pilot command and the mitigating command may be non-coextensive. For example, the mitigating command can have a shorter time duration and can have different start and end times than the pilot command. For example, the mitigating command can be subjected to phase lead or lag relative to the pilot command. In some embodiments, the start of the mitigating command can be delayed slightly from the pilot command to allow for some initial flexing of the structure of aircraft 10 and be applied only at the moment necessary to mitigate the unexpected response of aircraft 10 that would otherwise be exhibited.

In situations where the pilot commands a roll of aircraft 10 where the first flight control surfaces are ailerons 26 and the second flight control surface is rudder 30, if the pilot command of ailerons 26 causes downward movement of right wing 26A of aircraft 10, then the mitigating command of rudder 30 would comprise a left deflection of rudder 30. Alternatively, if the pilot command of ailerons 26 causes downward movement of left wing 26B of aircraft 10, then the mitigating command of rudder 30 would comprise a right deflection of rudder 30.

Figure 4:
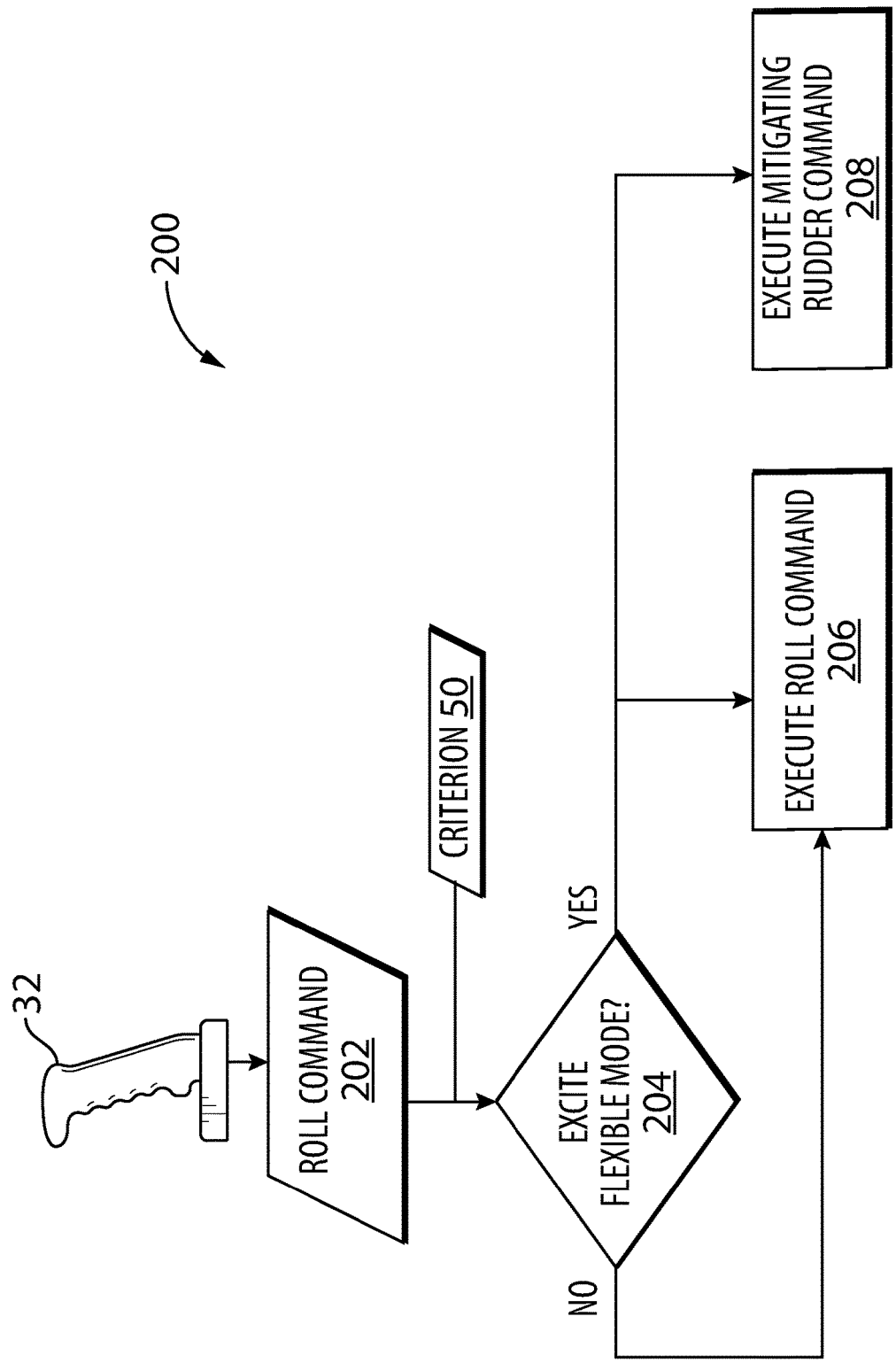
FIG. 4 is a flow diagram of another exemplary method for controlling the aircraft of FIG. 1.

FIG. 4 is a flow diagram of an exemplary method 200 for mitigating an effect of an excitation of a structural flexible mode of aircraft 10 during flight. Method 200 can be performed using system 12 described above or using other systems. For example, machine-readable instructions 42 can be configured to cause controller 34 to perform at least part of method 200. It is understood that aspects of method 200 can be combined with aspects of other methods described herein. In various embodiments, method 200 can comprise:

receiving a roll command (see block 202) having a characteristic that will cause the roll command to excite the structural flexible mode of aircraft 10 (see "YES" at block 204); and then executing the roll command (see block 206) in conjunction with a command of the rudder (see block 208) configured to mitigate the effect of the excitation of the structural flexible mode of aircraft 10.

Figure 5:
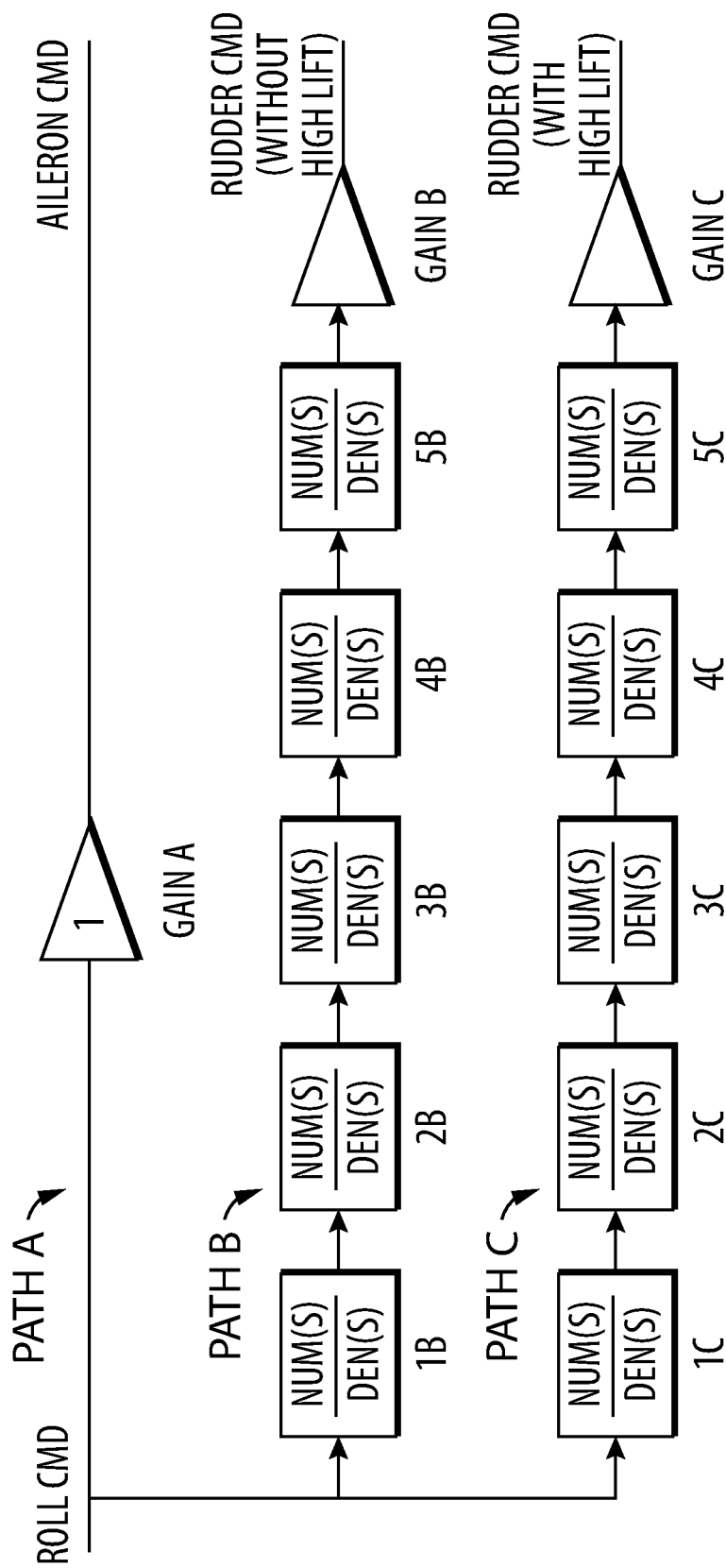
FIG. 5 is schematic representation illustrating another exemplary method for controlling the aircraft of FIG. 1.

FIG. 5 is another exemplary schematic representation of the method 100 or 200 implemented using various filters (e.g., transfer functions) for generating appropriate mitigating commands for appropriate operating conditions of aircraft 10 based on one or more characteristics of the pilot (e.g., roll) command. In other words, the use of the transfer functions in FIG. 5 can implicitly apply criterion 50 (see FIGS. 2-4) for the purpose of generating the appropriate mitigating commands when applicable. The approach illustrated in FIG. 5 can be implemented in the form of CLAWS using controller 34. The schematic shows three command paths where path A is the generation of an aileron command based on a roll command received from the pilot via pilot input device 32 for example. In some embodiments, the aileron command associated with the roll command can be generated based only on a suitable gain A (e.g., of value 1).

Path B relates to the generation of a mitigating rudder command in a situation where high-lift flight control surfaces (e.g., flaps 22 and slats 24) of aircraft 10 are retracted. Path C relates to the generation of a mitigating rudder command in a situation where high-lift flight control surfaces (e.g., flaps 22 and slats 24) of aircraft 10 are deployed. Path B can comprise a plurality of filters represented by predetermined transfer functions 1B to 5B and path C can comprise a plurality of filters represented by predetermined transfer functions 1C to 5C. The use of transfer functions 1B-5B and 1C-5C can be a manner of applying criterion 50 to determine if/when a mitigating rudder command is to be applied depending on the high-lift configuration of aircraft 10. For example, depending on one or more characteristics of the pilot command, paths A or B can output a mitigating command of suitable form if the pilot command is susceptible to excite the structural flexible mode(s), or, paths A or B can output a mitigating command of a zero magnitude and duration if the pilot command is not susceptible to excite the structural flexible mode(s). In some embodiments, transfer functions 1B and 10 can represent washout filters that reject inputs that are not susceptible of exciting structural flexible modes so as to reduce the effect of this implementation on rigid body modes of aircraft 10. Transfer functions 2B-4B and 2C-4C can represent second order band pass filters that are tailored for a specific flexible mode (e.g., FIN1B) of aircraft 10. Transfer functions 5B and 5C can represent low pass filters that reduce the effect of this implementation on frequencies that are higher than the frequencies of interest for the applicable flexible mode(s).

The gains and filter coefficients of the transfer functions in FIG. 5 can be selected based on criterion 50 and can therefore be selected to take into consideration one or more of the following parameters that can be indicative of the current operating condition of aircraft 10: settings of high-lift flight control surfaces, altitude of aircraft 10, speed (e.g., dynamic air pressure, Mach number, true air speed, equivalent air speed) of aircraft 10, weight of aircraft 10 and fuel quantity onboard aircraft 10 (e.g., inside wing(s) 16).

The mitigating rudder command for the configuration with the high-lift flight control surfaces retracted (e.g., without high-lift) can be generated based on gain B and the mitigating rudder command for the configuration with the high-lift flight control surfaces deployed (e.g., with high-lift) can be generated based on gain C. Since the speed of aircraft 10 is typically higher in the configuration with the high-lift flight control surfaces retracted, the magnitude of the mitigating rudder command in this configuration can be lower than the magnitude of the mitigating rudder command in the configuration with the high-lift flight control surfaces deployed. Accordingly, the magnitude of gain B can be lower than the magnitude of gain C in some embodiments. The generation of a mitigating rudder command based on a pilot input roll command can be considered a "cross-feed" from a roll command initiated by the pilot via a side stick to rudder 30 for example.

Even though FIG. 5 shows to separate paths B and C corresponding to two different operating conditions of aircraft 10, it is understood that a single path with appropriate transfer functions can be implemented to accommodate multiple operating conditions of aircraft 10. Also, even though FIG. 5 is specific to a roll pilot command and a mitigating rudder command, it is understood that the architecture of FIG. 5 can be adapted to other first and second flight control surfaces in order to implement method 100 illustrated in FIG. 3 for example.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A system for mitigating an effect of an excitation of a structural flexible mode of an aircraft during flight, the aircraft comprising first and second flight control surfaces of different types, the system comprising:
a pilot input device for receiving pilot input indicative of commands of one or more first flight control surfaces of the aircraft; and
a controller operatively coupled to the pilot input device to receive signals indicative of the commands of the one or more first flight control surfaces of the aircraft, the controller comprising a memory having a criterion programmed therein, the criterion comprising a predetermined frequency susceptible of exciting the structural flexible mode of the aircraft, the controller being configured to:
when a pilot command of the one or more first flight control surfaces having a characteristic that will cause the pilot command of the one or more first flight control surfaces to excite the structural flexible mode of the aircraft is received, cause the pilot command of the one or more first flight control surfaces to be executed in conjunction with a mitigating command of one or more second flight control surfaces configured to mitigate the effect of the excitation of the structural flexible mode of the aircraft,
wherein:
the mitigating command is of zero magnitude and duration when the pilot command is not susceptible to excite the structural flexible mode;
the mitigating command is generated through an application of transfer functions for applying the criterion; and
the pilot command of the one or more first flight control surfaces is oscillatory and the characteristic includes the predetermined frequency of the criterion for the pilot command of the one or more first flight control surfaces.

2. The system as defined in claim 1, wherein the characteristic includes a magnitude of the pilot command of the one or more first flight control surfaces corresponding to a predetermined magnitude susceptible of exciting the structural flexible mode of the aircraft included in the criterion.

3. The system as defined in claim 1, wherein the controller is configured so that:
when high-lift flight control surfaces of the aircraft are in a retracted configuration, the mitigating command of the one or more second flight control surfaces has a first magnitude; and
when the high-lift flight control surfaces of the aircraft are in a deployed configuration, the mitigating command of the one or more second flight control surfaces has a second magnitude different from the first magnitude.

4. The system as defined in claim 1, wherein a magnitude of the mitigating command of the one or more second flight control surfaces is dependent on an active high-lift configuration of the aircraft.

5. The system as defined in claim 1, wherein a magnitude of the mitigating command of the one or more second flight control surfaces is dependent on a magnitude of the pilot command of the one or more first flight control surfaces.

6. The system as defined in claim 1, wherein the characteristic is dependent on an altitude of the aircraft.

7. The system as defined in claim 1, wherein the characteristic is dependent on a speed of the aircraft.

8. The system as defined in claim 1, wherein the characteristic is dependent on a weight of the aircraft.

9. The system as defined in claim 1, wherein the characteristic is dependent on a fuel quantity in the aircraft.

10. The system as defined in claim 1, wherein the controller is configured to cause the pilot command of the one or more first flight control surfaces and the mitigating command of the one or more second flight control surfaces to be executed simultaneously.

11. The system as defined in any claim 1, wherein the first and second flight control surfaces are associated with different rotation axes of the aircraft.

12. The system as defined in claim 1, wherein the one or more first flight control surfaces comprise a rudder and the one or more second flight control surfaces comprise an aileron.

13. The system as defined in claim 1, wherein the one or more first flight control surfaces comprise an elevator and the one or more second flight control surfaces comprise an aileron.

14. The system as defined in claim 1, wherein the one or more first flight control surfaces comprise an aileron and the one or more second flight control surfaces comprise a rudder.

15. The system as defined in claim 14, wherein the command of the aileron causes downward movement of a right wing of the aircraft and the command of the rudder causes a left deflection of the rudder.

16. The system as defined in claim 1, wherein the structural flexible mode includes bending of a vertical stabilizer of the aircraft.

17. The system as defined in in claim 1, wherein the structural flexible mode includes bending of a fuselage of the aircraft.

18. The system as defined in in claim 1, wherein the structural flexible mode includes torsion of a fuselage of the aircraft.

19. The system as defined in in claim 1, wherein the structural flexible mode includes bending of a wing of the aircraft.

* * * * *